US011609918B2

(12) United States Patent
O'Toole

(10) Patent No.: US 11,609,918 B2
(45) Date of Patent: Mar. 21, 2023

(54) USER AUGMENTED INDEXING AND RANKING OF DATA

(71) Applicant: LOOKIIMEDIA (UK) LIMITED, London (GB)

(72) Inventor: Julia O'Toole, London (GB)

(73) Assignee: Lookiimedia (UK) Limited, London (GB)

( * ) Notice: Subject to any disclaimer, the term of this patent is extended or adjusted under 35 U.S.C. 154(b) by 0 days.

(21) Appl. No.: 16/340,226

(22) PCT Filed: Oct. 9, 2017

(86) PCT No.: PCT/GB2017/053046
§ 371 (c)(1),
(2) Date: Apr. 8, 2019

(87) PCT Pub. No.: WO2018/065792
PCT Pub. Date: Apr. 12, 2018

(65) Prior Publication Data
US 2020/0042529 A1     Feb. 6, 2020

(30) Foreign Application Priority Data

Oct. 7, 2016   (GB) ...................................... 1617104

(51) Int. Cl.
*G06F 16/00*     (2019.01)
*G06F 16/2457*   (2019.01)
(Continued)

(52) U.S. Cl.
CPC .... *G06F 16/24578* (2019.01); *G06F 16/2291* (2019.01); *G06F 16/285* (2019.01)

(58) Field of Classification Search
CPC ........... G06F 16/2291; G06F 16/24578; G06F 16/285; G06F 16/901; G06F 16/907; G06F 16/9562
(Continued)

(56) References Cited

U.S. PATENT DOCUMENTS

| 8,626,769 B1 * | 1/2014 | Bhatt ..................... G06Q 40/12 |
| | | 707/740 |
| 2005/0021553 A1 * | 1/2005 | Romijn ............... G06F 16/3325 |
| | | 707/999.102 |

(Continued)

OTHER PUBLICATIONS

International Search Report for PCT/GB2017/053046 dated Feb. 12, 2018, 2 pages.
(Continued)

*Primary Examiner* — Michelle N Owyang
(74) *Attorney, Agent, or Firm* — Nixon & Vanderhye, P.C.

(57) ABSTRACT

The application relates to a method for creating a user-augmented index, including: receiving information identifying data, a first user-created category and a first user-designated value from the first user. The data, the first user-created category, and the first user-designated value are associated together in a data entry in the user-augmented index. A second user-created category and a second user-designated value are received from the second user. The second user-created category and the second user-designated value are also associated with the data entry in the user-augmented index. The application further relates to ranking one or more related data entries in response to a query of a user-augmented index.

19 Claims, 11 Drawing Sheets

(51) Int. Cl.
*G06F 16/28* (2019.01)
*G06F 16/22* (2019.01)

(58) Field of Classification Search
USPC .................................. 707/705–780
See application file for complete search history.

(56) References Cited

U.S. PATENT DOCUMENTS

| | | | |
|---|---|---|---|
| 2005/0197846 A1* | 9/2005 | Pezaris | G06Q 10/0637 |
| | | | 705/7.36 |
| 2007/0124208 A1 | 5/2007 | Schachter et al. | |
| 2007/0214097 A1* | 9/2007 | Parsons | G06Q 50/01 |
| | | | 706/12 |
| 2007/0239760 A1* | 10/2007 | Simon | G06Q 10/06 |
| | | | 707/999.102 |
| 2009/0024605 A1* | 1/2009 | Yang | G06F 16/9535 |
| | | | 707/999.005 |
| 2009/0100043 A1* | 4/2009 | Stefik | G06N 5/022 |
| 2012/0158733 A1* | 6/2012 | McGill | G06Q 10/10 |
| | | | 707/741 |
| 2014/0074934 A1* | 3/2014 | van Hoff | G06F 16/2237 |
| | | | 709/204 |
| 2014/0280214 A1* | 9/2014 | Han | G06F 16/9535 |
| | | | 707/748 |
| 2014/0289231 A1* | 9/2014 | Palmert | G06F 16/345 |
| | | | 707/723 |
| 2015/0278339 A1* | 10/2015 | Cherukuri | G06F 16/22 |
| | | | 707/738 |

OTHER PUBLICATIONS

EPO Examination Report for EP Application No. 17 817 819.0 dated Feb. 18, 2021.
Yusuke Yanbe et al: "Can social bookmarking enhance search in the web?", Digital Libraries, ACM, 2 Penn Plaza, Suite 701 New York NY 10121-0701 USA, Jun. 18, 2007 (Jun. 18, 2007), pp. 107-116, XP058362928, DOI: 10.1145/1255175.1255198 ISBN: 978-1-59593-644-8.

* cited by examiner

1000

Query results: pushchair 1004　　　　　　1006　　　　　　1008

USER AUGMENTED INDEXING AND RANKING OF DATA

This application is the U.S. national phase of International Application No. PCT/GB2017/053046 filed Oct. 9, 2017 which designated the U.S. and claims priority to GB Patent Application No. 1617104.3 filed Oct. 7, 2016, the entire contents of each of which are hereby incorporated by reference.

FIELD OF INVENTION

The present invention is in the field of indexing electronic data. More specifically, but not exclusively, the present invention relates to user-augmented indexing and ranking of data.

BACKGROUND

A search engine provides rapid access to digital information. Typically, a search engine indexes information for quick lookup. Once indexed, the content can be searched and ranked.

Crowdsourcing combines the efforts of numerous decentralized self-selected volunteers or part-time workers, each person's contribution combining with those of others to achieve a cumulative crowdsourced result. Social bookmarking, collaborative tagging, and structured annotation systems, are different forms of crowdsourcing information. For example users may tag and comment on publically posted photos on Flickr, or add an annotation to a Wikipedia page. The tags provided on social bookmarking sites are sometimes searchable. For example, searching Flickr for the tag "blue" may turn up various photos that posters have tagged with this phrase.

Search engines typically use proprietary algorithms to automatically index, collect, parse, and store data to facilitate fast information retrieval. Once relevant information is identified in an index, a search engine can rank and provide the relevant information to the user. By determining what properties will be indexed and how to rank results, a search engine exerts a singular authority over the decisions about the digital information that will be locatable to users.

Depending on how data is indexed and ranked by a search engine, it can be very difficult for a user to find that data online. Sometimes data is indexed by a search engine, but not under every concept relevant to users. Short of a change in the indexing algorithm, it may be difficult to find the data associated with some concepts in the index. In other cases relevant digital data may be properly identified by a search engine, but ranked so far below less relevant results that a user may never discover the data.

With prior search engine methods, access to information is provided based on decisions made by singular authorities. Because those decisions are closed to the public, prior methods do not allow distributed users to contribute their insights and experience to determine how digital information gets associated with concepts. The crowd can provide information and associations that are different from those provided by machine-derived systems because users can contribute, for example, qualitative information and information about their experiences. Users can create new associations that machine-derived systems would not generate. Prior systems fail to allow users to leverage the knowledge of other users to find information that the crowd considers to be relevant.

It is an object of the present application to describe a method for creating a user-augmented index and ranking one or more related data entries in response to a query of a user-augmented index, which overcomes the disadvantages of the prior art, or at least provides a useful alternative.

SUMMARY OF INVENTION

According to a first aspect of the invention there is provided a method for creating a user-augmented index, including:
receiving information identifying data;
receiving a first user-created category for the data from a first user;
receiving a first user-designated value for the first user-created category from the first user;
associating the data, the first user-created category, and the first user-designated value together in a data entry in the user-augmented index;
receiving a second user-created category for the data from a second user;
receiving a second user-designated value for the second user-created category from the second user; and
associating the second user-created category and the second user-designated value with the data entry in the user-augmented index.

According to a further aspect, the first user and the second user may be members of a social media network platform that includes the user-augmented index.

According to a further aspect, the information identifying data may be received from a third user initiating the data entry into the user-augmented index.

According to a further aspect, the data may include at least one of: text, photo, video, audio, a document, or a link.

According to a further aspect, the first user-created category may be selected from a category list.

According to a further aspect, the first user-created category may be received from a text field entry in a user-created category interface in a client application.

According to a further aspect, the method may further include the step of:
receiving a first user-created value type for the first user-created category.

According to a further aspect, the first user-designated value may be of the first user-created value type.

According to a further aspect, the method may further include the steps of:
receiving a third user-designated value for the first user-created category from a fourth user; and
associating the third user-designated value for the first user-created category with the data entry in the user-augmented index.

According to a further aspect, the method may further include the steps of:
receiving interactive information relating to the data; and
saving the interactive information with the data entry in the user-augmented index.

According to a further aspect, the interactive information relating to the data entry may include at least one of: a comment, a number of data copies, a geographic location, a submitter, a creation time, a creation date, a rating, a number of views, an associated data entry, changes to the data entry, file size, a link, a tag, a topic of conversation, a price, an associated user group, a file, a permissions parameter, or a vote parameter.

According to a further aspect, there may be a system configured to create the user-augmented index via the method of the first aspect.

According to a further aspect, there may be a computer program configured to create the user-augmented index via the method of the first aspect.

According to a further aspect, there may be an electronically readable medium configured to store the computer program of the first aspect.

According to a second aspect of the invention there is provided a method for ranking one or more related data entries in response to a query of a user-augmented index, the method including:

receiving the query from a first user, the query including a query parameter;

polling the user-augmented index to identify the one or more related data entries relating to the query parameter, each respective data entry of the one or more related data entries including a respective first user-created category and a first user-designated value received from a second user; and ranking the one or more related data entries based on their respective user-created categories and user-designated values to generate one or more ranked data entries.

According to a further aspect, the first user and the second user may be members of a social media network platform that includes the user-augmented index.

According to a further aspect, the method may further include the steps of:

receiving a user profile for the first user; and searching the user-augmented index to identify one or more related data entries associated with the user profile.

According to a further aspect, the user profile may be received via social media.

According to a further aspect, the user profile may be constructed by one or more user selections.

According to a further aspect, the user profile may be a learned profile.

According to a further aspect, the user profile may include at least one of: an age, a gender, a geographic location, or one or more friends.

According to a further aspect, the user profile may include information identifying a data entry in the user-augmented index in which the first user created a user-designated value or a user-generated category.

According to a further aspect, generating the ranked data entries may further include ranking the one or more related data entries based on the user profile.

According to a further aspect, the method may further include the step of:

searching the user-augmented index to identify one or more related data entries relating to the user group.

According to a further aspect, each respective data entry of the one or more related data entries may include at least one of a user-created category by a member of the user group, or was initiated by a member of the user group.

According to a further aspect, each respective member of the user group may join the user group.

According to a further aspect, each respective member of the user group may have a respective user profile that includes a user group criteria.

According to a further aspect, generating the ranked data entries may further include ranking the one or more related data entries based on the user group.

According to a further aspect, the method may further include the step of:

searching the user-augmented index to identify one or more related data entries relating to a specific user or a company.

According to a further aspect, the first user-created category may be selected from a category list.

According to a further aspect, the first user-created category may be received from a text field entry in a user-created category interface in a client application.

According to a further aspect, at least one related data entry of the one or more related data entries may include a second user-created category with a second user-designated value from a third user.

According to a further aspect, the query parameter may include keywords.

According to a further aspect, the query parameter may include user-created categories and user-designated values.

According to a further aspect, the data may include at least one of: text, photo, video, audio, or a link.

According to a further aspect, the data may be edited by a fourth user.

According to a further aspect, the method may further include the step of:

searching a user-augmented index to identify one or more related data entries with respective interactive information relating to the query parameter.

According to a further aspect, the interactive information relating to the data entry may include at least one of: a comment, a number of data copies, a geographic location, a submitter, a creation time, a creation date, a rating, a number of views, an associated data entry, changes to the data entry, file size, a link, a tag, a topic of conversation, a price, an associated user group, a file, a permissions parameter, or a vote parameter.

According to a further aspect, wherein generating the ranked data entries may further include ranking the one or more related data entries based on the respective interactive information to create one or more ranked data entries.

According to a further aspect, the method may further include the step of:

displaying the one or more ranked data entries.

According to a further aspect, each respective data entry of the one or more ranked data entries may include an icon, and displaying the one or more ranked data entries may include displaying the icon for each respective ranked data entry.

According to a further aspect, the one or more data entries may include at least one text-based data entry, and displaying the icon for the text-based data entry may include displaying a miniaturized version of at least a portion of the text-based data entry.

According to a further aspect, the method may further include the steps of:

receiving an icon from a fifth user; and associating the icon with the data entry.

According to a further aspect, the method may further include the step of:

upon receiving a user selection, displaying a user selected data entry.

According to a further aspect, there may be a system configured to rank one or more related data entries in response to a query of a user-augmented index via the method of the second aspect.

According to a further aspect, there may be a computer program configured to rank one or more related data entries in response to a query of a user-augmented index via the method of any one of the second aspect.

According to a further aspect, there may be an electronically readable medium configured for storing the computer program of the second aspect.

According to a further aspect, there may be a method and system as herein described with reference to the Figures.

Other aspects of the invention are described within the claims.

BRIEF DESCRIPTION OF THE DRAWINGS

Embodiments of the invention will now be described, by way of example, with reference to the accompanying drawings in which.

DETAILED DESCRIPTION OF PREFERRED EMBODIMENTS

The present invention provides a method, system, and computer program for creating a user-augmented index and the ranking relevant data entries from the user-augmented index.

Figure 1:
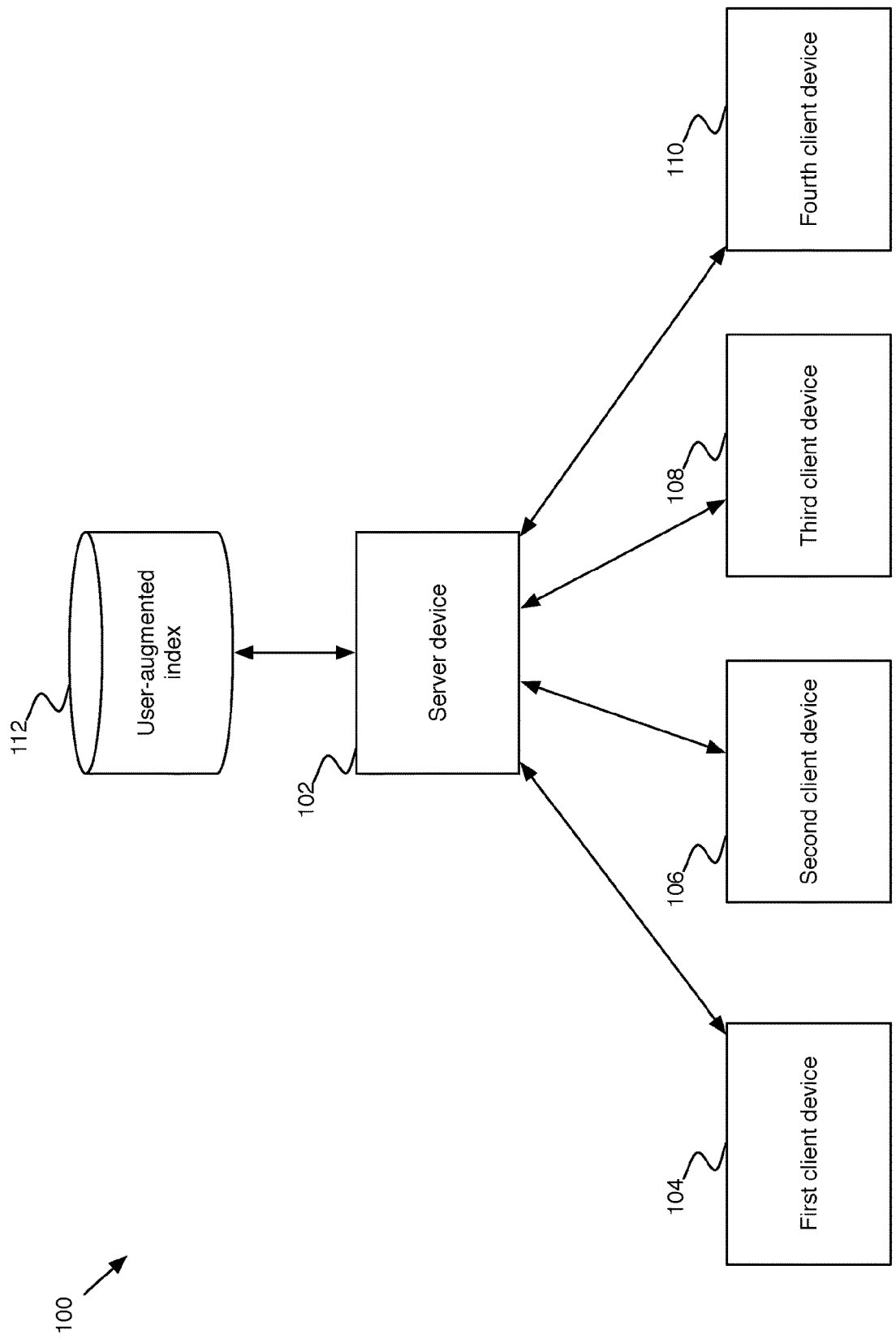
FIG. 1: shows system 100 in accordance with an embodiment of the invention.

FIG. 1 depicts a system 100 in accordance with an embodiment. System 100 includes server device 102, first client device 104, and user-augmented index 112. In examples, system 100 may further include second client device 106, third client device 108, and fourth client device 110.

Server device 102 may be operable to receive information relating to the user-augmented indexing of data and to associate that information with the data in user-augmented index 112. First client device 104, second client device 106, third client device 108, and fourth client device 110 may be operable to allow a user to augment the indexing of data or query data in user-augmented index 112 via server device 102. First client device 104, second client device 106, third client device 108, and fourth client device 110 may be further operable to allow a user to query a user-augmented index 112 via server device 102.

Figure 2:
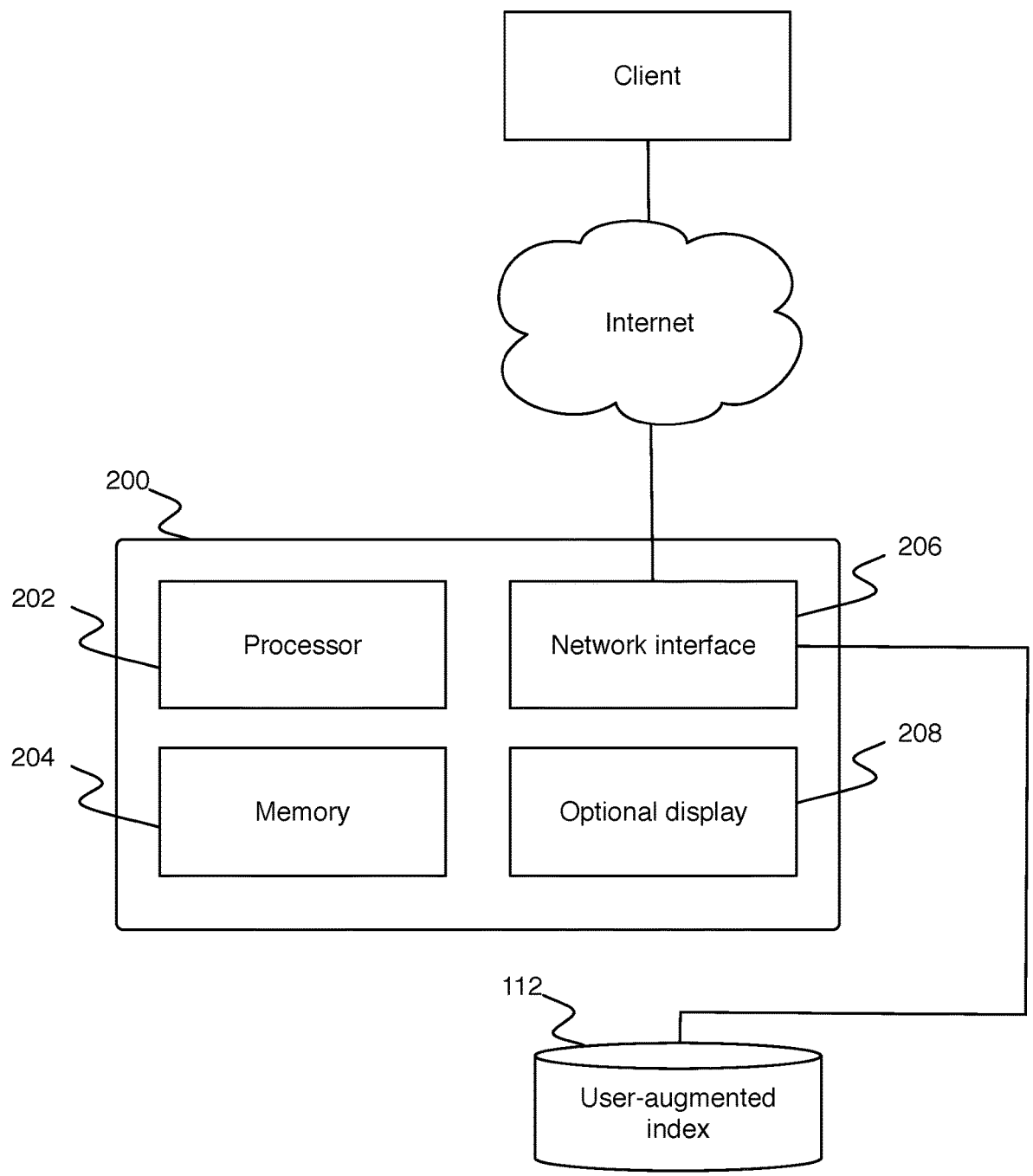
FIG. 2: shows system 200 in accordance with an embodiment of the invention.

Server device 102 may include a processing device 200, as depicted in FIG. 2. Processing device 200 includes a processor 202, a memory 204, and a network interface 206. In examples, processing device 200 may further include an optional display 208.

Processor 202 may be configured to execute computer instructions, which, when executed on system 100, perform a portion or all of the methods described in relation to FIGS. 4 to 10. In embodiments, processor 202 may include a single, or any multiple number of processors, as will be understood by those of skill in the art.

Memory 204 may be an electronically readable medium or a computer readable medium configured to store computer program instructions. In examples, memory 204 may include a non-transitory medium. Stored computer program instructions, when executed on the processor 202, may perform a portion or all of the methods described in relation to FIGS. 4 to 10.

In examples, processor 202 and memory 204 may be incorporated into a custom chipset, such as a system on a chip. For example, processor 202 and memory 204 may be incorporated into a custom Snapdragon, Tegra, Mali-400, Cortex, Samsung Exynos, Intel Atom, Apple, or Motorola chip, or any other type of chip known to those of skill in the art.

In examples, portions of the methods described in relation to FIGS. 4 to 10 may be stored or executed outside of system 100. For example, a portion of the methods described in relation to FIGS. 4 to 10 may be stored or executed on a combination of a server and cloud storage facility via the Internet.

Network interface 206 may be configured to communicate with devices external to server device 102. Through network interface 206, server device 102 may access first client device 104, second client device 106, third client device 108, fourth client device 110, and user-augmented index 112.

In examples, network interface 206 may include wired or wireless interfaces. Network interface 206 may include WIFI, 3G, 4G, Ethernet, or any other communications known to those of skill in the art. Network interface 206 may further include a short-range or low-powered wireless standard such as Bluetooth, Bluetooth LE, zigbee, or near field communication (NFC). In examples, processing device 200 may request, send, or receive information, save information, or send or receive messages from a remote device over Internet 108.

In examples, first client device 104, second client device 106, third client device 108, or fourth client device 110 may be a hand-held or mobile computing device such as a smart phone, a tablet, a smart watch, or a wearable device. In further examples, first client device 104, second client device 106, third client device 108, or fourth client device 110 may be a computing apparatus such as a smart TV, a video game console, a laptop, a desktop computer, or an app-enabled piece of household hardware.

FIG. 1 includes a server device 102. Server device 102 may be operable to execute instructions, or to retrieve and save data in user-augmented index 112. In examples, server device 102 may include a single server, or multiple servers in a distributed architecture. In examples, user-augmented index 112 may be a relational database, a NoSQL database, a distributed database, or any other database known to those of skill.

Figure 3:
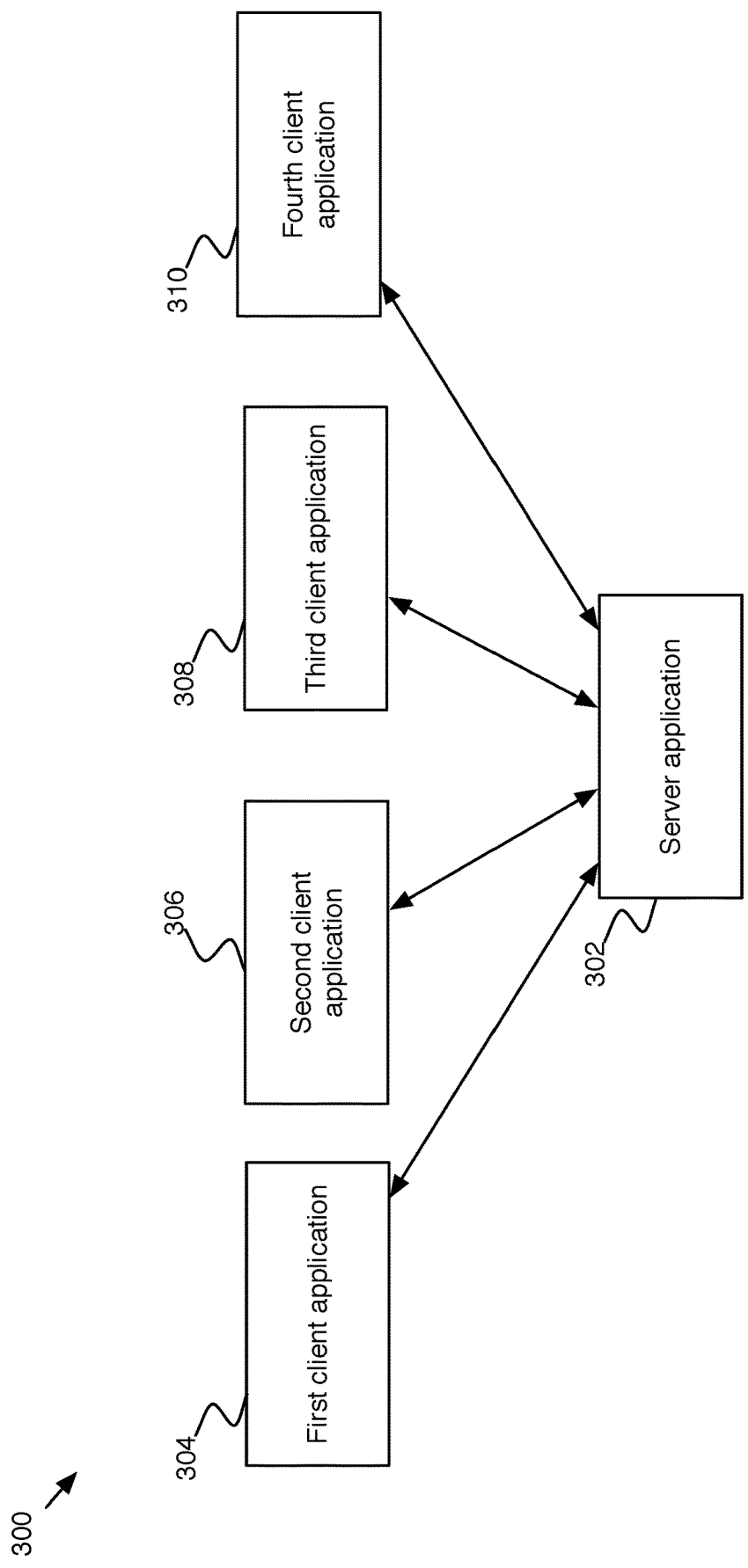
FIG. 3: shows system 300 in accordance with an embodiment of the invention.

FIG. 3 depicts system 300, in accordance with an embodiment. System 300 may facilitate the creation of a user-augmented index, or identify and rank one or more related data entries in response to a query of a user-augmented index. System 300 includes server application 302 and first client application 304. System 300 may further include second client application 306, third client application 308, and fourth client application 310.

Server application 302 may be configured to receive input from first client application 304, second client application 306, third client application 308, or fourth client application 310 to create or receive a search query for a user-augmented index. Server application 302 may save and query data in user-augmented index 112.

In examples, server application 302, first client application 304, second client application 306, third client application 308, and fourth client application 310 may each operate on separate devices. For example, server application 302 may operate on server device 102; first client application 304 may operate on first client device 104; second client application 306 may operate on second client device 106; third client application 308 may operate on third client device 108; and fourth client application 310 may operate on fourth client device 110.

In further examples, however, the functions of any one of server application 302, first client application 304, second client application 306, third client application 308, or fourth client application 310 may be distributed across additional computing devices. For example, server application 302 may operate across a group of distributed servers.

Figure 4:
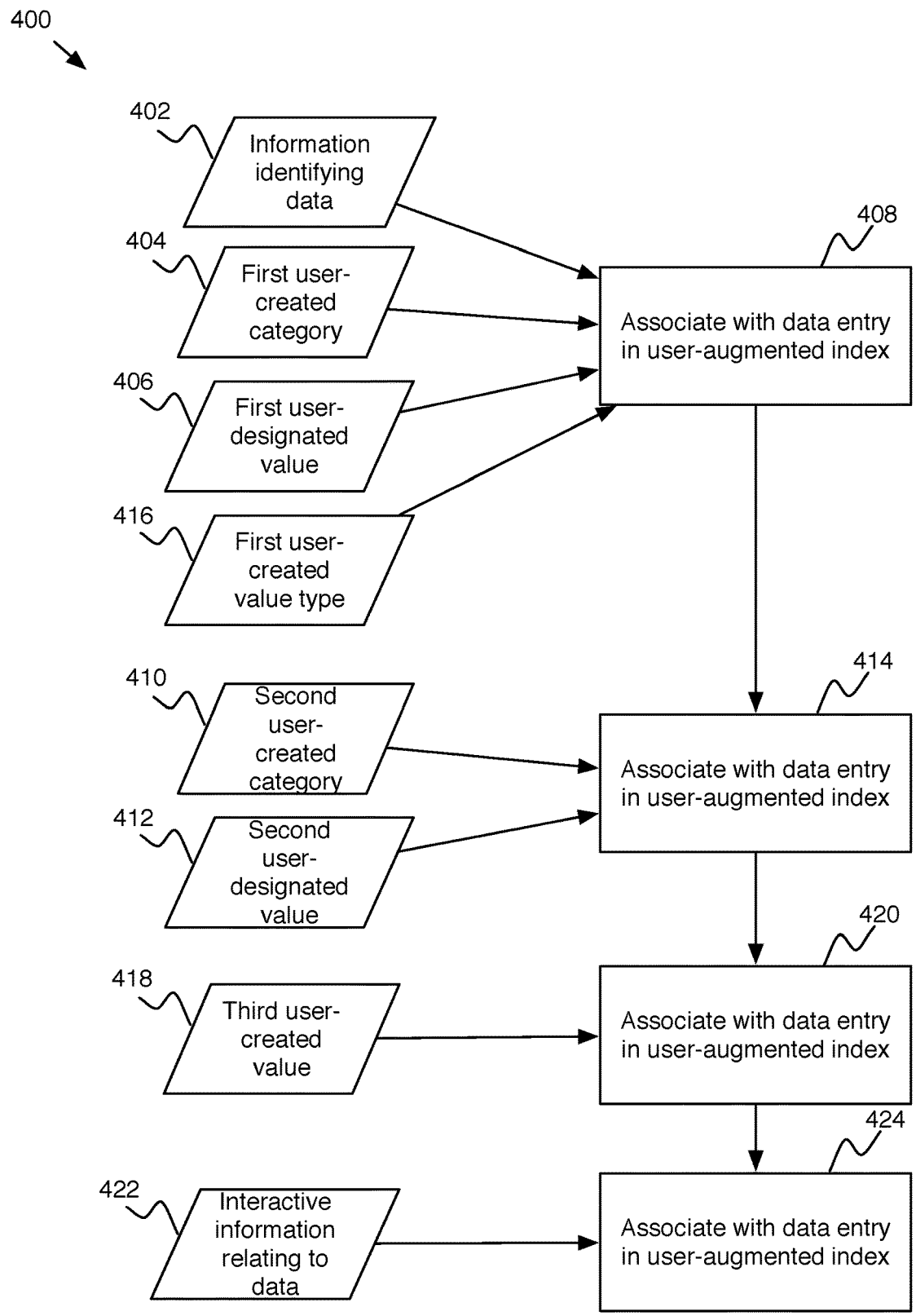
FIG. 4: shows method 400 in accordance with an embodiment of the invention.

FIG. 4 depicts method 400, an example embodiment that may be executed by server application 302. Method 400 may facilitate the creation of a user-augmented index.

The user-augmented index includes data entries that are indexed with the assistance of distributed users, or users who are not indexing under the direction and supervision of a singular authority. For example, the distributed users may be participants in a crowdsourcing, a social bookmarking, or a collaborative tagging environment. With distributed user indexing, each user may categorize one or more data entries in the user-augmented index according to his or her personal knowledge and experience.

In examples, the user-augmented index may include user-provided information. In further examples, however, the user-augmented index may also include information created by a machine-derived indexing program.

Method 400 begins with step 402. In step 402, information identifying data is received. In examples, the information identifying data may include a reference to data, such as a link, a shortcode, or the actual data itself. The data identified will be indexed with a data entry in the user-augmented index 112.

For example, information identifying data 402 may be a URL to a photo of an actress, or a website describing an actress.

Figure 8:
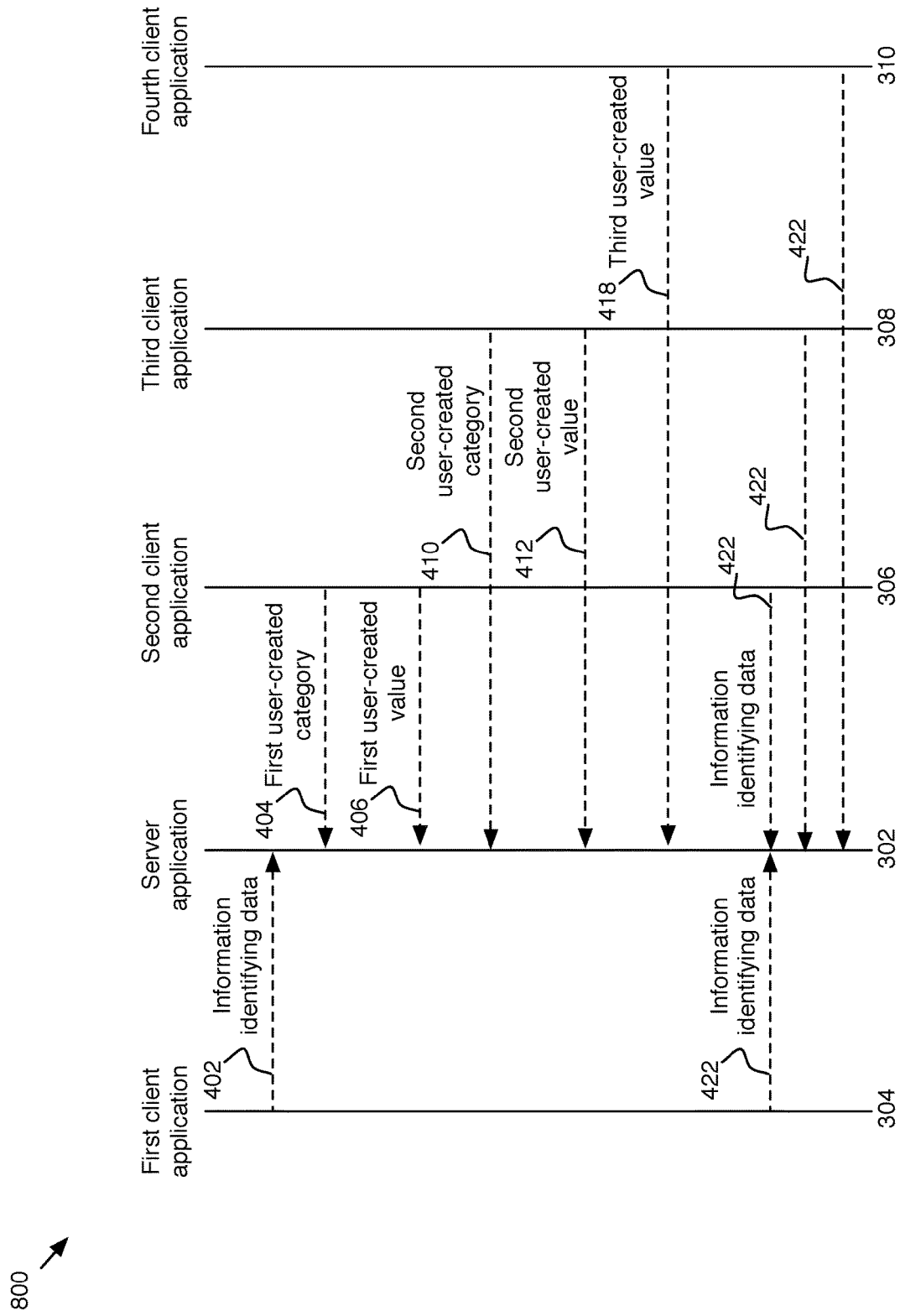
FIG. 8: shows system 800 in accordance with an embodiment of the invention.

FIG. 8 depicts a sequence diagram for example user-augmented indexing system 800. In the example of system 800, information identifying data 402 may be received at server application 302 from first client application 304.

Figure 5:
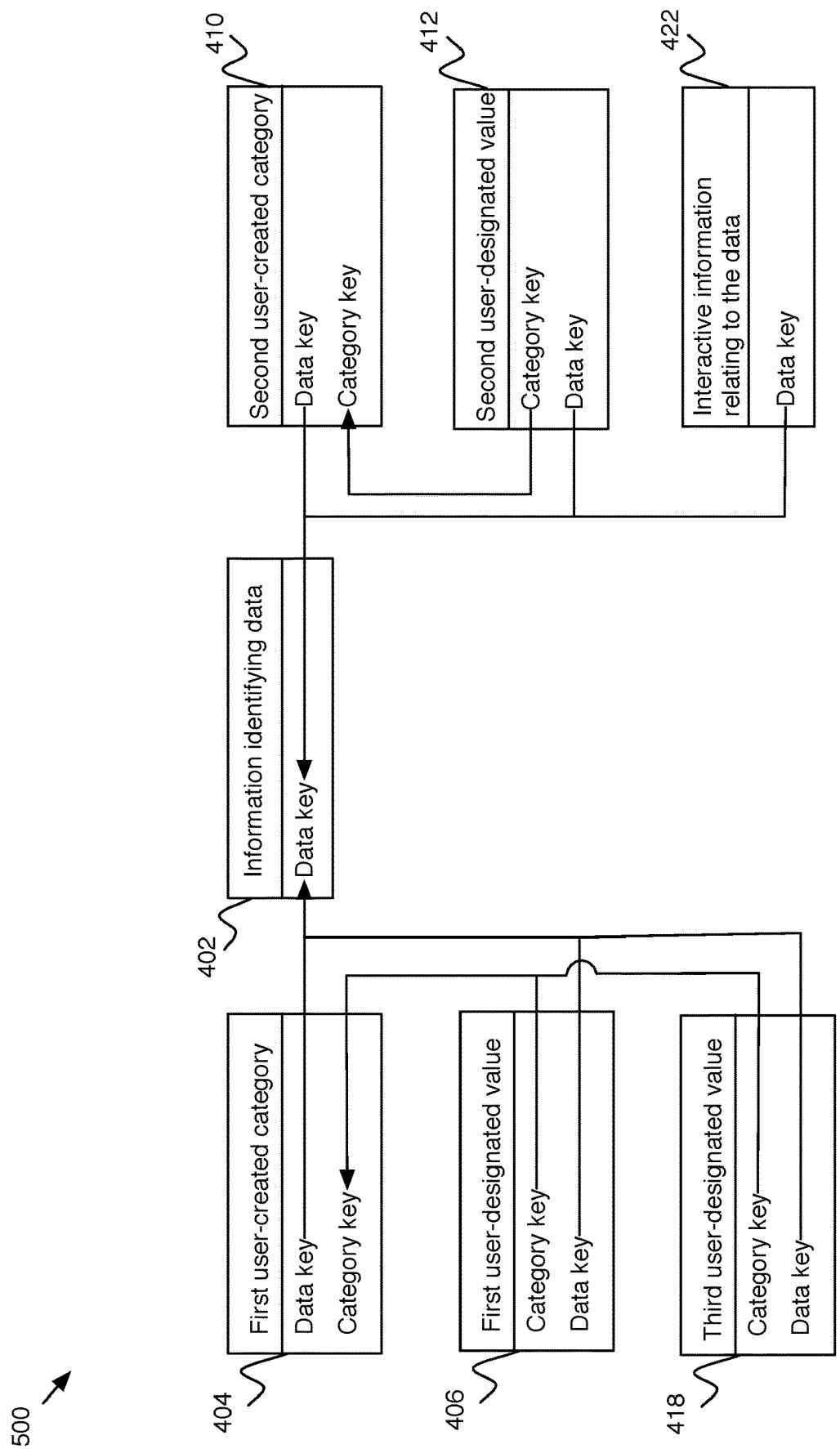
FIG. 5: shows indexed data 500 in accordance with an embodiment of the invention.

FIG. 5 depicts a data structure diagram for an example indexed data 500. FIG. 5 visually represents all of the data associated with information indentifying data 402.

The data identified may include any type of electronic data known to those of skill in the art. In examples, the data may include at least one of: text, photo, video, audio, a document, a website, or a link.

Figure 7:
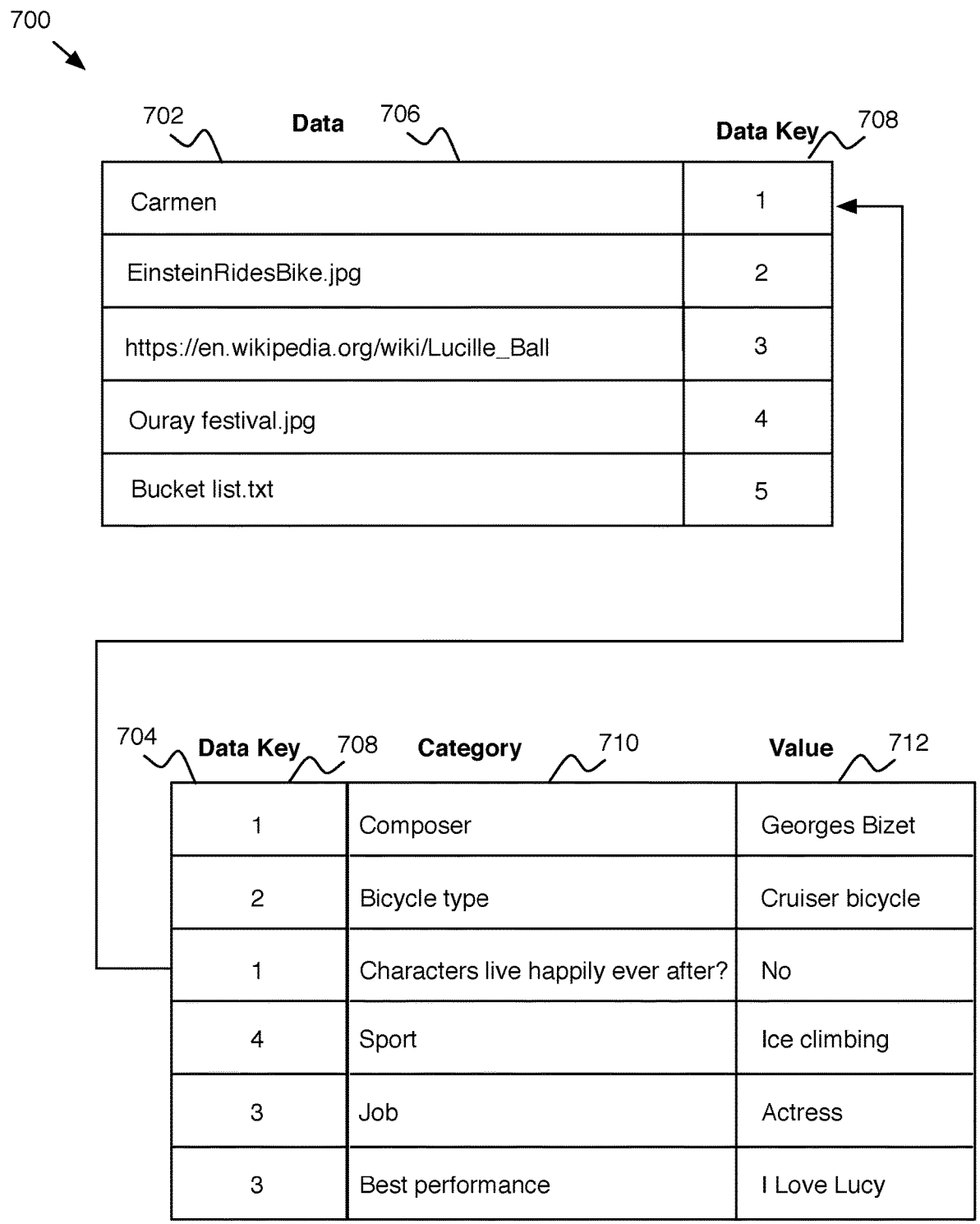
FIG. 7: shows index system 700 in accordance with an embodiment of the invention.

In examples, indexed data 500 may comprise one or more data entries in one or more databases. For example, FIG. 7 depicts example user-augmented index system 700. User-augmented index system 700 includes data entry table 702 and user-augmented index 704.

The example of FIG. 7 includes two tables, but this is not intended to be limiting. In embodiments, user-augmented index system 700 may include any number of tables, databases, or indexes.

Data entry table 702 includes a data column 706 and a key column 708. In examples, data column 706 may include a reference to data, or the data itself. Key column 708 includes an identifier that can be used to reference associated data in user-augmented index 704.

For example, data entry table 702 includes an entry for the opera "Carmen". "Carmen" corresponds to the key value "1".

Method 400 continues with step 404. In step 404, a first user-created category is received for the data from a first user. The user-created category may include a category created by the user to index the data. In examples, the first user may provide input at second client application 306.

For example, as depicted in FIG. 8, first user-created category 404 may be transmitted from second client application 306 and received at server application 302.

In examples, the first user-created category may be selected from a category list. A category list may include a selection of categories available to be associated with data. In further examples, however, the first user-created category may be received from a text field entry in a user-created category interface in a client application.

Figure 9:
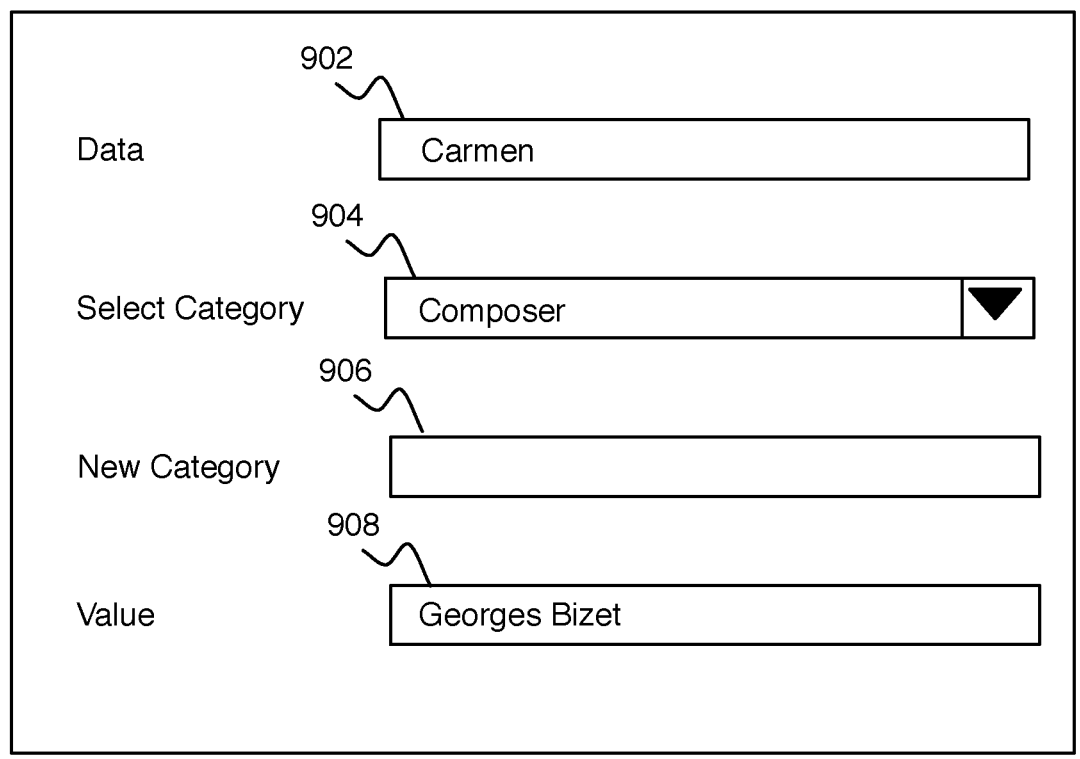
FIG. 9: shows user interface 900 in accordance with an embodiment of the invention.

For example, FIG. 9 depicts a user-created category user interface 900. As may be seen in user-created category user interface 900, data field 902 displays the data 702 for a row of data entry table 702, the text string "Carmen".

User-created category user interface 900 may be used to associate a category with data 902. For example, select category field 904 provides a drop down box that may be used to select a category for the data 902. Alternatively, new category field 906 provides a text field where a user may enter a custom user-created category. In examples, the user-created category may be a new category that is not provided in the select category field 904.

In the example of user-created category user interface 900, the first user-created category 904 "Composer" is associated with the opera "Carmen" using select category field 906.

Method 400 continues with step 406. In step 406, a first user-designated value is received for the first user-created category from the first user. First user-designated value 406 is a value assigned by a user to the first user-created category 404. In examples, first user-designated value may be a binary value, a number, a string, or any combination of binary values, numbers and/or strings. In examples, first user-designated value may be selected from a list of possible data values, such as a list of colours. In further examples, however, first user-designated value may be entered into a text field. First user-designated value may be any kind of value known to those of skill in the art.

FIG. 8 depicts first user-created value 406, which may be transmitted from second client application 306 and received at server application 302.

In the example of user-created category user interface 900, a value field 908 includes the value, "Georges Bizet". In examples, value field 908 may be a text entry field where a user can enter any value. In further examples, however, value field 908 may include a mechanism to select one of a number of preset values. For example, value field 908 may include a drop down selection box or a radio box.

Method 400 continues with step 408. In step 408, the data, the first user-created category, and the first user-designated value are associated together in a data entry in a user-augmented index.

Returning to the example index system 700, it may be seen that user-augmented index table 704 includes three columns: a key column 708, a category column 710, and a value column 712. The first row of user-augmented index table 704 includes a key value of "1", a reference to "Carmen". The category for the first row is "Composer", and the value is "Georges Bizet". In this way, the information provided by the first user may be associated with the data to provide an improved user-augmented index 704.

Returning to the example of, indexed data 500, first user-created category 404 and first user-designated value 406 may both include a data key that identifies information identifying data 402. In addition, first user-designated value 406 may include a category key that identifies first user-created category 404.

Method 400 continues with steps 410, 412 and 414. In step 410, a second user-created category is received for the data from a second user. In step 412, a second user-designated value is received for the second user-created category from the second user. In step 414, the second user-created category and the second user-designated value are associated with the data entry in the user-augmented index.

Steps 410, 412, and 414 are similar to steps 404, 406, and 408, except that they address receiving a user-created category and a user-designated value from an additional user.

For example, as depicted in FIG. 8, second user-created category 410 and second user-created value 412 may be transmitted from third client application 308 and received at server application 302.

Returning to the example index system 700, it may be seen that row 3 includes the user-created category, "Characters live happily ever after?", which is associated with the value, "No".

As may further be seen in the example indexed data 500, second user-created category 410 and second user-designated value 412 may also be included. Second user-created category 410 and second user-designated value 412 may each include a data key that identifies information identifying data 402. Second user-designated value 412 may include a category key that identifies second user-created category 410.

By allowing a first user and a second user to contribute categories and/or associated values with data in a user-augmented index, it may be possible to enhance the index with additional information beyond what is provided over a machine-derived index provided from a singular authority. Distributed users may add information to a user-augmented index to associate data with concepts in entirely new, useful ways. In examples, the contributions to the user-augmented index may include an experiential or qualitative dimension, capturing the wisdom of the crowd. The additional information provided by users may provide for a more robust, index that is capable of providing improved search results that leverage user experiences of data, such as the opera, "Carmen," in addition to those provided by a machine algorithm. The contributions of distributed users may also be leveraged to rank results.

In examples, the first user and the second user may be members of a social media network platform that facilitates user contributions to the user-augmented index. A social media network is an online community of people who use a social media network platform or other technologies to communicate with each other and share information, for example via the user-augmented index.

In examples, the first user or the second user may initiate contributing to the indexing of data in the user-augmented index. For example, either one of the first user or the second user may transmit information identifying data 402 to server application 302. In examples, the information identifying data may alternatively be received from another user initiating the data entry into the user-augmented index.

For example, as may be seen in user-augmented index system 800, information identifying data 422 may be received from any of first, second, third, or fourth client applications 304, 306, 308, or 310.

In examples user-created value 406 may be associated with a value type, or unit, based on the first user-created category 404. For example, if first user-designated value 406 is the number "100" and first user-created category 404 is "resale price," then first user-designated value 406 may be associated with British pound.

In further examples, however, method 400 may include step 416. In step 416, a first user-created value type may be received for the first user-created category. A user-created value type may include, for example, one or more of a string, a number, a currency, a date, a time, a percentage, a fraction, a scientific unit, a binary value, or any custom data type known to those of skill.

For example, if a user-category of "income" is received at server application 302, a user-created value type of "GBP" may be associated with that first user-created category. By allowing a user to associate a user-created value type with data, this may allow a user to capture new experiences in the user-augmented index.

In examples, method 400 may further include steps 418 and 420. In step 418, a third user-designated value may be received for the first user-created category from a fourth user.

In step 420, a third user-designated value 418 for the first user-created category 404 may be associated with the data entry in the user-augmented index.

For example, returning to the example of, indexed data 500, third user-designated value 418 may include a data key that identifies information identifying data 402 and a category key identifying first user-created category 404.

Allowing a fourth user to contribute to the values designated for first user-created category 404 may further allow distributed users to leverage one another's creative contributions about a topic of interest. This may help provide for a more robust, improved index and ranking that provides more relevant search results to user queries.

In examples, method 400 may further include steps 422 and 424. In step 422, interactive information may be received relating to the data. Interactive information may include information and context relating to the interactions that users have with the data via the user-augmented index. In step 424, the interactive information may be associated with the data entry in the user-augmented index.

In examples, the interactive information relating to the data entry may include a comment. The comment may be provided by any of the users at any of the client applications.

In examples, the interactive information relating to the data entry may include a number of data copies. For example information identifying data 402 may have been received by server application 302 multiple times.

In examples, the interactive information relating to the data entry may include a geographic location. For example, the user or the data may be associated with a location.

In examples, the interactive information relating to the data entry may include a submitter, or the user who initiated sending the information identifying data 402 to the server application 302.

In examples, the interactive information relating to the data entry may include a creation time or a creation date. The creation time or creation date may include the creation time of the data, when the information identifying data 402 was sent to server application 302, or the creation time of a user-created category.

In examples, the interactive information relating to the data entry may include a rating. The ratings may be provided by one or more contributing users.

In examples, the interactive information relating to the data entry may include a number of views by users.

In examples, the interactive information relating to the data entry may include an associated data entry.

In examples, the interactive information relating to the data entry may include changes to the data entry.

In examples, the interactive information relating to the data entry may include a file size.

In examples, the interactive information relating to the data entry may include a link. The link may point to related information.

In examples, the interactive information relating to the data entry may include a tag. A tag may include one or more related keywords.

In examples, the interactive information relating to the data entry may include a topic of conversation.

In examples, the interactive information relating to the data entry may include a price.

In examples, the interactive information relating to the data entry may include an associated user group.

In examples, the interactive information relating to the data entry may include a file.

In examples, the interactive information relating to the data entry may include a permissions parameter. For example, some data entries may have permissions that only allow some users or user groups to access the data.

In examples, the interactive information relating to the data entry may include a vote parameter. In examples, the vote parameter may reflect the collective rating provided by different users.

If the interactive information includes a geographic location of the user who contributed the user-created category, "Characters live happily ever after?", for example, the geographic information may therefore be associated with the opera Carmen and/or the user-created category. If multiple users provide user-created categories or user-designated values from Verona Italy, for example, Verona may be associated with Carmen. The interactive information associated with the opera Carmen may therefore reflect the collective experience of those who saw Carmen performed in Verona. This may allow more relevant index search and ranking results for users located in Verona, for instance.

Figure 6A:
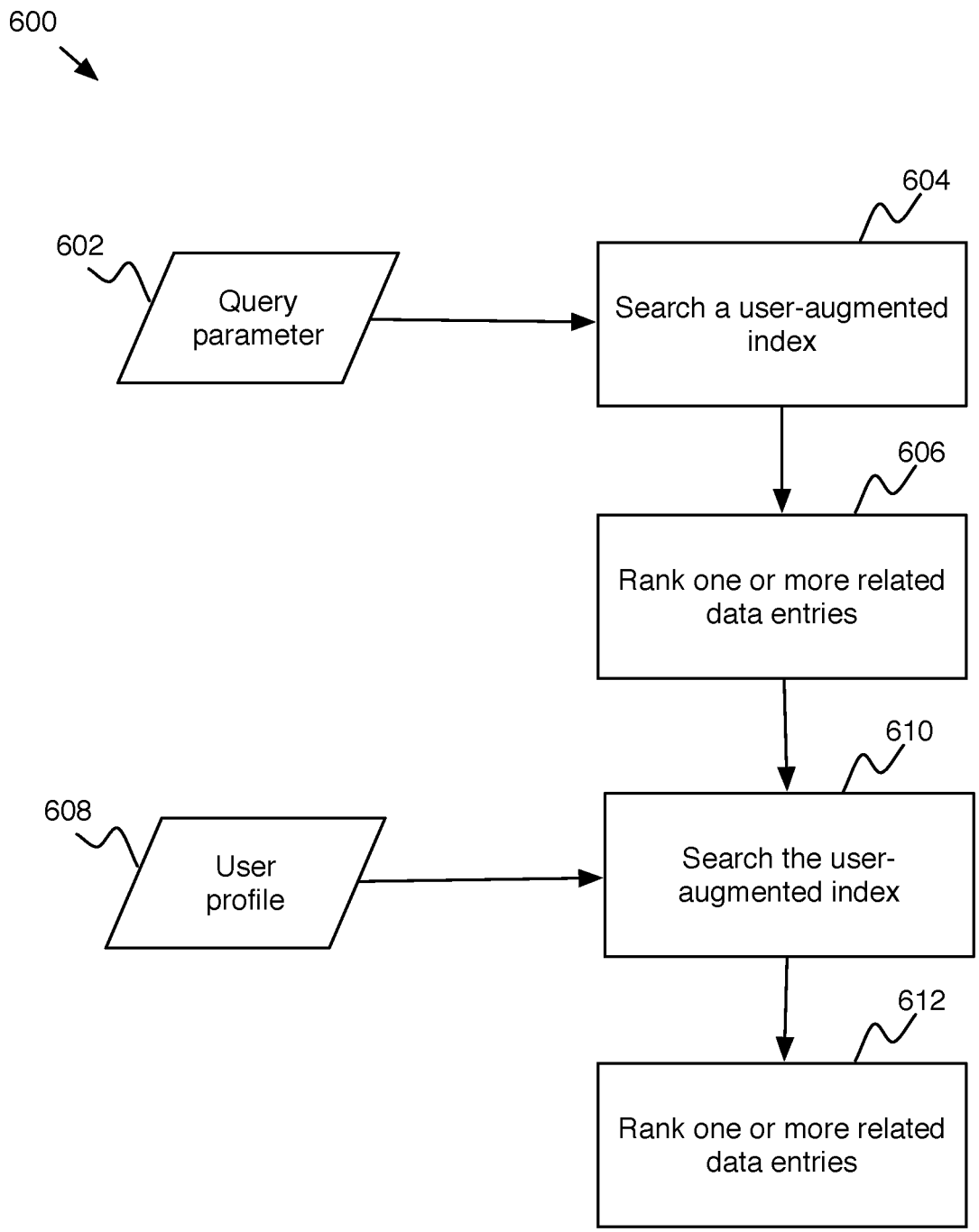
FIG. 6A: shows method 600 in accordance with an embodiment of the invention.
Figure 6B:
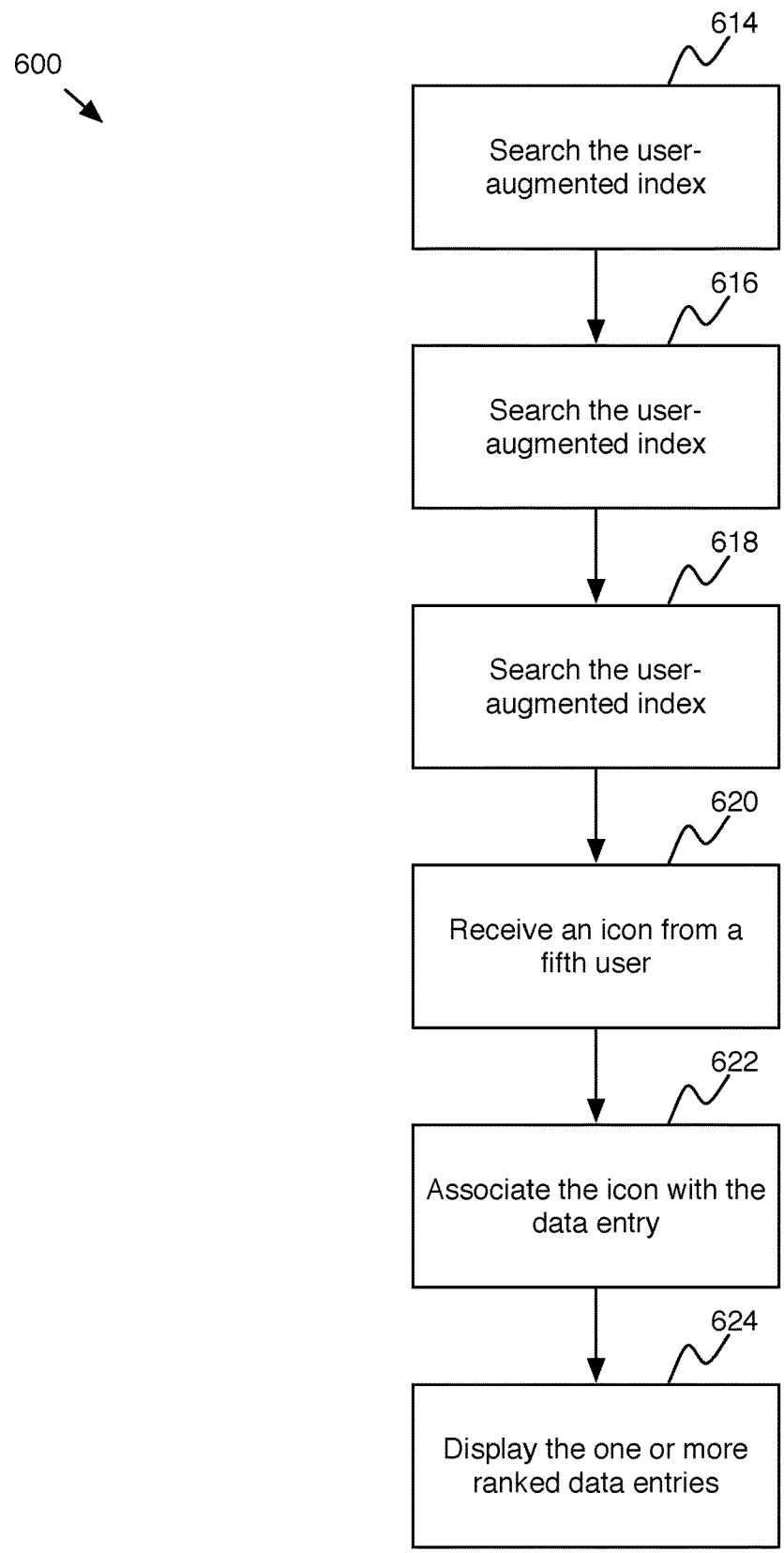
FIG. 6B: shows method 600 in accordance with an embodiment of the invention.

FIGS. 6A and 6B depict a further embodiment, method 600. Method 600 may be used to rank one or more relevant data entries identified using a user-augmented index.

Method 600 begins with step 602. In step 602, a query is received from a first user, the query including a query parameter.

Query 602 is received by the first user seeking information relevant to the query parameter. For example, query 602 may be a web search query.

The query parameter may include a string of text, a digital file, or any other type of query parameter or data known to those of skill in the art. For example, the query parameter may include keywords, a question, or a photo.

Method 600 continues with step 604. In step 604, a user-augmented index is searched to identify one or more related data entries relating to the query parameter, each respective data entry of the one or more related data entries including a respective first user-created category and a first user-designated value received from a second user.

For example, the one or more related data entries relating to the query parameter may have a first user-created category and a first user-designated value associated with them via the methods of steps 404, 406, and 408.

In examples, step 604 may include searching the category column 710 and/or value column 712 of user-augmented index 704.

Category column 710 includes user-defined categories and value column 712 includes user-designated values. In examples, category column 710 and value column 712 may further include machine-derived information, however. For example, category column 710 and value column 712 may include categories and values provided by a machine-derived search engine index software.

For example, if a query is received including the query parameter, "ice climbing", a search may turn up a data key of "4" in user-augmented index 704. Using the key value of 4, it is possible to look up associated data in the data entry table 702, to find the data, "Ouray festival.jpg", a picture of an ice climber competing in the Ouray ice climbing festival.

Method 600 continues with step 606. In step 606, the one or more related data entries are ranked based on their respective user-created categories and user-designated values to generate one or more ranked data entries. One or more ranked data entries include one or more of the related data entries, each respective ranked data entry including a respective rank.

Steps 602, 604, and 606 may allow a user to obtain more robust search results because the user-augmented index incorporates crowd-sourced contributions and insights. This may allow a user to leverage associations that may not be found by a machine-derived algorithm alone. This may allow users a direct way to contribute to an index to reflect cultural attitudes, terminology, and styles of the moment. Once indexed, the one or more ranked data entries may be ranked using the user contributions as well, providing a more robust search result to users.

In examples, the first user and the second user may be members of a social media network platform that includes the user-augmented index. This may allow the users of the social media network platform to interact to leverage each other's insights about digital data indexed by the user-augmented index.

In examples, method 600 may include further steps. For example, method 600 may include steps 608 and 610. In step 608, a user profile may be received for the first user.

In examples, user profile 608 may include one or more of a user's name, email address, password, phone number, and other biographical information. In examples, user profile 608 may further include one or more user interests, groups, connections, and preferences, or any other information known to those of skill in the art.

In examples, at least a portion of the user profile may be received via social media. For example, a user may register with the social media network platform including the user-augmented index, or via another social media network, such as Facebook.

In examples, at least a portion of the user profile may be constructed by one or more user selections. For example, at least a portion of the user profile may be constructed when registering for a social media network platform, by prompting users to answer one or more questions about their backgrounds and interests. In further examples, at least a portion the user profile may be constructed by allowing a user to designate tag words to be associated with the user profile. In further examples, at least a portion of the user profile may be constructed by allowing a user to create categories and values to associate with the user profile, much like the user-created categories and user-designated values associated with data described in steps 404, 406, and 408 above.

In examples, at least a portion of the user profile may be a learned profile. A learned profile may include information learned via the user's use of a platform such as a social media network, a search engine, or any other platform allowing a user to augment data in a user-augmented index. For example, a user that enters a query for a pushchair may be determined to be an expectant parent.

In examples, the user profile may include at least one of: an age, a gender, a geographic location, or one or more friends.

In examples, the user profile may include information identifying a data entry in the user-augmented index in which a user contributed a user-designated value, a user-generated category, a user-defined value, or a user-defined value type. For example, the user-designated category may be entered by a user via user interface 900 via fields 904 or 906, and the value may be entered via field 908.

In step 610, the user-augmented index may be searched to identify one or more related data entries associated with the user profile. For example, a user may be identified as a new parent based on information identifying a data entry identifying contributions relating to infants in the user profile.

In examples, method 600 may further include step 612. In step 612, the ranked data entries generated may further include ranking the one or more related data entries based on the user profile.

For example, if a user sends a query including the query parameter "mobile," the one or more related data entries may include mobile phones and hanging mobiles for babies. If the user profile indicates that the user is an expectant parent, the one or more related data entries may be ranked to place those relating to a hanging mobile for babies towards the top.

By ranking the one or more related data entries obtained by querying a user-augmented index, the ranking based on the user profile, it may be possible to provide more robust search results.

In examples, method 600 may further include step 614. In step 614, the user-augmented index may be searched to identify one or more related data entries relating to the user group.

By searching the user-augmented index to identify one or more related data entries relating to the user group, and user may be able to determine what information is relevant to a specific group of people of interest, based on the insights members of the user group have contributed to the user-augmented index.

In examples, each respective data entry of the one or more related data entries may include at least one of a user-created category by a member of the user group, or was initiated by a member of the user group. For example, a user may contribute a user-created category via steps 404, 406, and 408. Alternatively, or additionally, a user may include data in the user-augmented index by sending information identifying data 402 to a server.

By including one or more related data entries that include a user group member-created user-created category, or one or more related data entries that were initiated by a member of the user group, this may allow a user to receive one or more ranked data entries that reflect the user group contributions to a user-augmented index by the user group's members.

In examples, each respective member of the user group may join the user group. In examples members may require an invitation and approval, or may be able to simply join without confirmation. This may allow a user to search for the contributions of group to form based on self-identified interests.

In examples, each respective member of the user group may have a respective user profile that includes a user group criteria. The user group criteria may reflect a user profile setting that was selected by, or learned from a user. For example, the user group criteria may include a tag, a category, or a value associated with the user profile. In examples, the user group criteria may include: a geographic region, an educational association like a university or a grade school class, an age, a weight, a height, a hair colour, an ethnicity, a birth date, a marital status, a favourite football team, etc. This list of user group criteria examples is not intended to be limiting, in further examples the user group criteria may include any other user profile information known to those of skill in the art.

In examples, generating the ranked data entries may further include ranking the one or more related data entries based on the user group. This may further allow a user to prioritize receiving results based on their group affiliation.

In examples, method 600 may further include step 616. In step 616, the user-augmented index may be searched to identify one or more related data entries relating to a specific user or a company.

For example, a user may wish to search for baby pushchairs based on the contributions to a user-augmented index provided by a celebrity mother. Alternatively, the user may wish to search for a pushchair based on the contributions to a user-augmented index made by a company making related goods.

In examples, the first user-created category may be selected from a category list, as described above.

In examples, the first user-created category may be received from a text field entry in a user-created category interface in a client application, as described above.

In examples, at least one related data entry of the one or more related data entries may include a second user-created category with a second user-designated value from a third user. For example, the second user-created category and designated value may be received via steps 412, 412, and 414 above.

In examples, the query parameter may include keywords.

In examples, the query parameter may include user-created categories and user-designated values, as described above.

In examples, the data may include at least one of: text, photo, video, audio, or a link.

In examples, the data may be edited by a fourth user. For example, if the data includes text, a photo, video, audio, or a link, the fourth user may revise any of these data types and save a new version, to be referenced by the user-augmented index. By allowing users to edit the data, this may allow users to provide even more information that can be leveraged by the crowd.

In examples, method 600 may further include step 618. In step 618, a user-augmented index may be searched to identify one or more related data entries with respective interactive information relating to the query parameter.

In examples, the interactive information relating to the data entry may include at least one of: a comment, a number of data copies, a geographic location, a submitter, a creation time, a creation date, a rating, a number of views, an associated data entry, changes to the data entry, file size, a link, a tag, a topic of conversation, a tag, a price, an associated group, a price, a file, a permissions parameter, or a vote parameter.

In examples, generating the ranked data entries may further include ranking the one or more related data entries based on the respective interactive information to create one or more ranked data entries.

By allowing one or more related data entries to be identified or ranked based on interactive information, it may be possible to use the context of how users contribute to a user-augmented database to provide improved search results.

In examples, each respective data entry of the one or more ranked data entries may include an icon, and displaying the one or more ranked data entries includes displaying the icon for each respective ranked data entry.

Figure 10:
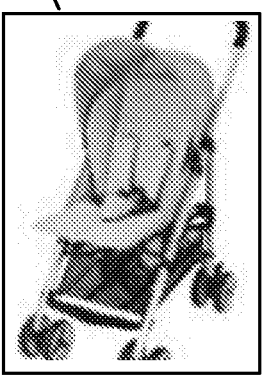
FIG. 10: shows user interface 1000 in accordance with an embodiment of the invention.
Figure 10:
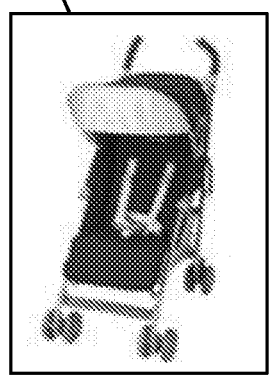
Figure 10:
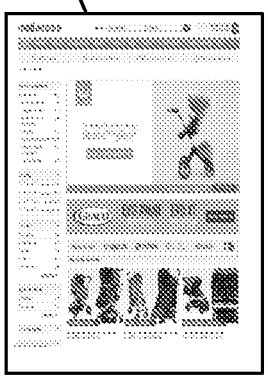

For example, FIG. 10 depicts query results user interface 1000. Query results user interface 1000 includes query parameter 1002, which is "pushchair" in the example. One or more ranked data entries 1004, 1006, and 1008 are provided. Each of the one or more ranked data entries 1004, 1006, and 1008 include an icon representing the results.

For example, the one or more ranked data entries 1004 and 1006 each include respective icons representing a different pushchair. Each of the icons may represent a respective ranked data entries 1004 and 1006 including a link to a website describing or selling that particular pushchair.

In examples, the one or more data entries may include at least one text-based data entry, and displaying the icon for the text-based data entry may include displaying a miniaturized version of at least a portion of the text-based data entry.

For example, ranked data entry 1008 is associated with an icon with a miniaturized view of a website that sells pushchairs. Ranked data entry 1008 may include a link to the pushchair selling website, for which users may have made contributions to the user-augmented index.

In examples, method 600 may further include steps 620 and 622. In step 620, an icon may be received from a fifth user. In examples, the fifth user may be different from the first, second, third, or fourth users. In further examples, however, the fifth user may be the same as any of the first, second, third, or fourth users.

In step 622, the icon may be associated with the data entry.

For example, if a query results user interface displays an icon for a ranked data entry including a recipe, a user who prepares the recipe may be able to change the icon from one showing miniaturized text version of the recipe to an image from a user who prepared the dish.

By allowing data entries in the user-augmented index to be associated with an icon, this may allow users to be able to better identify one or more ranked results, and further provide their insights about the ranked results. This may provide for improved, more robust query results and better user comprehension of the results, based on the collected wisdom of the crowd.

In examples, method 600 may further include step 624. In step 624, upon receiving a user selection, a user selected data entry may be displayed. For example, FIG. 10 depicts query results user interface 1000, which displays one or more ranked data entries 1004, 1006, and 1008.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A computer implemented method for creating a user-augmented index, the method including:

receiving information identifying data;

receiving a first user-created category for the data from a first device associated with a first user, the first user-created category comprising a category created by the first user by entry of the category in a first text field of a user interface displayed on the first device to index the data;

receiving a first user-designated value for the first user-created category from the first device associated with the first user, the first user-designated value comprising text entered by the first user in a second text field of the user interface displayed on the first device;

storing the data, the first user-created category comprising the category created by the first user, and the first user-designated value comprising the entered text in association in a data entry in the user-augmented index;

after storing the data, the first user-created category, and the first user-designated value in the data entry in the user-augmented index, receiving a second user-created category for the data from a second device associated with a second user, the second user-created category comprising a category created by the second user by entry of the category in a first text field of a user interface displayed on the second device to index the data;

receiving a second user-designated value for the second user-created category from the second device associated with the second user, the second user-designated value comprising text entered by the second user in a second text field of the user interface displayed on the second device;

storing the second user-created category comprising the category created by the second user and the second user-designated value comprising the entered text in association with the data entry in the user-augmented index;

after storing the second user-created category and the second user-designated value with the data entry, receiving a third user-designated value for the first user-created category from a third device associated with a third user, the third user-designated value comprising third text entered by the third user in a text field of a user interface displayed on the third device;

storing the third user-designated value for the first user-created category with the data entry in the user-augmented index;

receiving, from the first device, the second device and the third device, interactive information relating to the data, the interactive information including geographic locations of the first user, the second user and the third user;

receiving user profile information of the first user, the second user and the third user, the user profile information including a user group, among a plurality of user groups, of which the respective user is a member;

storing interactive information and the user profile information in the user-augmented index in association with user-created categories and user-designated values entered by the first, second and third users, wherein each of the first user-created category, the first user-designated value, the second user-created category, the second user-designated value, and the third user-designated value in the user-augmented index is associated with one of the plurality of user groups to which the first user, the second user or the third user is a member and the geographic locations of the first user, the second user and the third user;

after storing the data, the first user-created category, the first user-designated value, the second user-created category, the second user-designated value, and the third user-designated value in the user-augmented index, receiving a query from an external device;

in response to receiving the query, searching the user-augmented index to identify a plurality of entries related to the query in the user-augmented index based on the user groups associated with the user-created categories and the user-created values;

ranking the plurality of entries based on the user groups associated with user-created categories, user-designated values related to the plurality of entries and the geographic locations of the first user, the second user and the third user; and providing a response to the query, the response identifying data stored in association with the identified plurality of entries in the user-augmented index based on the ranking.

2. The method as claimed in claim 1, wherein the first user and the second user are members of a social media network platform that includes the user-augmented index.

3. The method as claimed in claim 1, wherein the information identifying data is received from a fourth device associated with a fourth user initiating the data entry into the user-augmented index.

4. The method as claimed in claim 1, wherein the data includes at least one of: text, photo, video, audio, a document, or a link.

5. The method as claimed in claim 1, wherein the first user-created category is selected from a category list.

6. The method as claimed in claim 1, wherein the first user-created category is received from the first text field displayed simultaneously with the information identifying the data and the second text field of the user interface displayed on the first device.

7. The method as claimed in claim 1, the method further comprising:
receiving a first user-created value type for the first user-created category.

8. The method as claimed in claim 1, wherein the first user- designated value is of a first user-created value type.

9. The method as claimed in claim 1, wherein the interactive information relating to the data entry includes at least one of: a comment, a number of data copies, a submitter, a creation time, a creation date, a rating, a number of views, an associated data entry, changes to the data entry, file size, a link, a tag, a topic of conversation, a price, an associated user group, a file, a permissions parameter, or a vote parameter.

10. The method as claimed in claim 1, further comprising:
after storing the data, the first user-created category, the first user-designated value, the second user-created category, the second user-designated value, and the third user-designated value in the user-augmented index: receiving a first query entered by the first user from the first device, a second query entered by the second user from the second device and a third query entered by the third user from the third device; in response to receiving the first, second, and third queries, searching the user-augmented index to identify one or more entries related to the first, second, and third queries in the user-augmented index; and providing a first, second and third responses to the first, second and third queries, the first, second and third responses identifying data stored in association with the identified one or more entries in the user-augmented index related to the first, second, and third queries;

receiving a fourth user-created category for the data from the first device associated with the first user, wherein the fourth user-created category comprises a category selected from a category drop-down list in the user interface displayed on the first device and the category drop-down list is populated at least in part by previously entered user-created categories;

receiving a fourth user-designated value for the fourth user-created category from the first device associated with the first user, wherein the fourth user-designated value is selected from a value drop-down list in the user interface displayed on the first device and the value drop-down list is populated at least in part by previously entered user-created values;

storing the fourth user-created category comprising the category selected by the first user and the fourth user-designated value comprising the value selected by the first user in association with the data entry in the user-augmented index;

receiving user profile information of the first user, the second user, the third user and the fourth user, the user profile information of each of the first, second and third users including a user group, among a plurality of user groups, of which the respective user is a member and wherein one or more of the user profile information is associated with a company name; and storing the user profile information in the user-augmented index in association with user-created categories and user-designated values entered by the first, second, third and fourth users, wherein each of the first user-created category, the first user-designated value, the second user-created category, the second user-designated value, the third user-designated value, the fourth user-created category and the fourth user-created value in the user-augmented index is associated with one of the plurality of user groups to which the first user, the second, the third user or the fourth user is a member, and wherein the user-augmented index is searched to identify the plurality of entries related to the first, second and third queries in the user-augmented index and a specific user or a company based on the stored user profile information in the user-augmented index, based on the company name associated with the one or more of the user profile information, and based on the user group of the plurality of user groups associated with the user-created categories and the user-created values, the plurality of entries are ranked based on the stored user profile information and the user group of the plurality of user groups associated with user-created categories and user-designated values related to the plurality of entries, and the plurality of ranked entries are provided in the response to the first, second and third queries.

11. The method as claimed in claim 1, further comprising:
after storing the data, the first user-created category, the first user-designated value, the second user-created category, the second user-designated value, and the third user-designated value in the user-augmented index: receiving a first query entered by the first user from the first device, a second query entered by the second user from the second device and a third query entered by the third user from the third device; in response to receiving the first, second, and third queries, searching the user-augmented index to identify one or more entries related to the first, second, and third queries in the user-augmented index; and providing a first, second and third responses to the first, second and third queries, the first, second and third responses identifying data stored in association with the identified one or more entries in the user-augmented index related to the first, second, and third queries, wherein the plurality of entries are ranked based on their respective user-created categories and user-designated values, and the plurality of ranked entries are provided in the response to the query.

12. The method as claimed in claim 1, further comprising:
wherein the user-augmented index is searched to identify the plurality of entries related to the query in the user-augmented index based on the stored user profile information in the user-augmented index, the plurality of entries are ranked based on the stored user profile information associated with user-created categories and user-designated values related to the plurality of entries, and the plurality of ranked entries are provided in the response to the query.

13. A system comprising:
a processor, and
a memory operatively connected to the processor, wherein the memory stores instructions that, when executed by the processor, cause the system to:
receiving information identifying data;
receive a first user-created category for the data from a first device associated with a first user, the first user-created category comprising a category created by the first user by entry of the category in a first text field of a user interface displayed on the first device to index the data;
receive a first user-designated value for the first user-created category from the first device associated with the first user, the first user-designated value comprising text entered by the first user in a second text field of the user interface displayed on the first device;
store the data, the first user-created category comprising the category created by the first user, and the first user-designated value comprising the entered text in association in a data entry in a user-augmented index;
after storing the data, the first user-created category, and the first user-designated value in the data entry in the user-augmented index, receive a second user-created category for the data from a second device associated with a second user, the second user-created category comprising a category created by the second user by entry of the category in a first text field of a user interface displayed on the second device to index the data;
receive a second user-designated value for the second user-created category from the second device associated with the second user, the second user-designated value comprising text entered by the second user in a second text field of the user interface displayed on the second device;
store the second user-created category comprising the category created by the second user and the second user-designated value comprising the entered text in association with the data entry in the user-augmented index;
after storing the second user-created category and the second user-designated value with the data entry, receive a third user-designated value for the first user-created category from a third device associated with a third user, the third user-designated value comprising third text entered by the third user in a text field of a user interface displayed on the third device;
store the third user-designated value for the first user-created category with the data entry in the user-augmented index;
receive, from the first device, the second device and the third device, interactive information relating to the data, the interactive information including geographic locations of the first user, the second user and the third user;
receive user profile information of the first user, the second user and the third user, the user profile information including a user group, among a plurality of user groups, of which the respective user is a member;
store interactive information and the user profile information in the user-augmented index in association with user-created categories and user-designated values entered by the first, second and third users, wherein each of the first user-created category, the first user-designated value, the second user-created category, the second user-designated value, and the third user-designated value in the user-augmented index is associated with one of the plurality of user groups to which the first user, the second user or the third user is a member and the geographic locations of the first user, the second user and the third user;
after storing the data, the first user-created category, the first user-designated value, the second user-created category, the second user-designated value, and the third user-designated value in the user-augmented index, receiving a query from an external device;
in response to receiving the query, searching the user-augmented index to identify a plurality of entries related to the query in the user-augmented index based on the user groups associated with the user-created categories and the user-created values;
rank the plurality of entries based on the user groups associated with user-created categories, user-designated values related to the plurality of entries and the geographic locations of the first user, the second user and the third user; and
provide a response to the query, the response identifying data stored in association with the identified plurality of entries in the user-augmented index based on the ranking.

14. The system of claim 13, wherein the information identifying data includes a link to an image file, the first user-created category identifies the category of content in the image file and the first user-defined value identifies a name of the content in the image.

15. The system of claim 13, wherein the response to the query identifies an image and the memory stores instructions that, when executed by the processor, further cause the system to: display the identified image.

16. The system of claim 13, wherein the memory stores instructions that, when executed by the processor, further cause the system to: receive, from the first device, the interactive information relating to the data, the interactive information including a comment input by the first user about the data, and associating the interactive information with the data in the user-augmented index.

17. The system of claim 16, wherein the interactive information includes a rating entered by the first user for the data.

18. The system of claim 13, wherein an identification for the data in the user-augmented index corresponds to an identification for the data in a machine-derived index, and wherein the memory stores instructions that, when executed by the processor, further cause the system to: search the machine-derived index to identify the one or more entries related to the query in the machine-derived index.

19. Non-transitory computer readable medium storing a computer program that, when executed by a processor, causes the processor to execute a method for creating a user-augmented index, the method comprising:

receiving information identifying data;

receiving a first user-created category for the data from a first device associated with a first user, the first user-created category comprising a category created by the first user by entry of the category in a first text field of a user interface displayed on the first device to index the data;

receiving a first user-designated value for the first user-created category from the first device associated with the first user, the first user-designated value comprising text entered by the first user in a second text field of the user interface displayed on the first device;

storing the data, the first user-created category comprising the category created by the first user, and the first user-designated value comprising the entered text in association in a data entry in the user-augmented index;

after storing the data, the first user-created category, and the first user-designated value in the data entry in the user-augmented index, receiving a second user-created category for the data from a second device associated with a second user, the second user-created category comprising a category created by the second user by entry of the category in a first text field of a user interface displayed on the second device to index the data;

receiving a second user-designated value for the second user-created category from the second device associated with the second user, the second user-designated value comprising text entered by the second user in a second text field of the user interface displayed on the second device;

storing the second user-created category comprising the category created by the second user and the second user-designated value comprising the entered text in association with the data entry in the user-augmented index;

after storing the second user-created category and the second user-designated value with the data entry, receiving a third user-designated value for the first user-created category from a third device associated with a third user, the third user-designated value comprising third text entered by the third user in a text field of a user interface displayed on the third device;

storing the third user-designated value for the first user-created category with the data entry in the user-augmented index;

receiving, from the first device, the second device and the third device, interactive information relating to the data, the interactive information including geographic locations of the first user, the second user and the third user;

receiving user profile information of the first user, the second user and the third user, the user profile information including a user group, among a plurality of user groups, of which the respective user is a member;

storing interactive information and the user profile information in the user-augmented index in association with user-created categories and user-designated values entered by the first, second and third users, wherein each of the first user-created category, the first user-designated value, the second user-created category, the second user-designated value, and the third user-designated value in the user-augmented index is associated with one of the plurality of user groups to which the first user, the second user or the third user is a member and the geographic locations of the first user, the second user and the third user;

after storing the data, the first user-created category, the first user-designated value, the second user-created category, the second user-designated value, and the third user-designated value in the user-augmented index, receiving a query from an external device;

in response to receiving the query, searching the user-augmented index to identify a plurality of entries related to the query in the user-augmented based on the user groups associated with the user-created categories and the user-created values;

ranking the plurality of entries based on the user groups associated with user-created categories, user-designated values related to the plurality of entries and the geographic locations of the first user, the second user and the third user; and providing a response to the query, the response identifying data stored in association with the identified plurality of entries in the user-augmented index based on the ranking.

* * * * *